United States Patent
Robinson (10) Patent No.: US 7,133,748 B2
(45) Date of Patent: Nov. 7, 2006

(54) METHOD AND SYSTEM FOR SYNCHRONIZING CLIMATE CONTROL DEVICES

(75) Inventor: Robert Fredrick Grenville Robinson, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 10/855,735

(22) Filed: May 27, 2004

(65) Prior Publication Data

US 2005/0267640 A1    Dec. 1, 2005

(51) Int. Cl.
*G05D 23/00* (2006.01)
(52) U.S. Cl. .................. 700/276; 700/277; 165/208
(58) Field of Classification Search ........ 700/276–278, 700/300; 165/208–209, 217, 253, 254
See application file for complete search history.

(56) References Cited

U.S. PATENT DOCUMENTS

| 3,612,164 A | 10/1971 | Miner ................... 165/22 |
| 3,838,733 A | 10/1974 | Erlandson .............. 165/22 |
| 4,136,732 A | 1/1979 | Demaray et al. ........ 165/16 |
| 4,931,948 A * | 6/1990 | Parker et al. ........... 700/277 |
| 5,303,767 A * | 4/1994 | Riley ...................... 165/208 |
| 6,453,993 B1 * | 9/2002 | Bujak, Jr. ............... 165/208 |
| 6,711,471 B1 * | 3/2004 | Kidder .................... 700/276 |
| 7,024,282 B1 * | 4/2006 | Coogan et al. .......... 700/276 |

OTHER PUBLICATIONS http://www.longvjewweb.com/w8665.htm, "Honeywell Wireless Programmable Thermostat's RF Receiver", James' A/C Co., Mar. 18, 2004, pp. 1-2.

* cited by examiner

*Primary Examiner*—Albert W. Paladini
*Assistant Examiner*—Alexander Kosowski
(74) *Attorney, Agent, or Firm*—Duke W. Yee; Herman Rodriguez; Wayne P. Bailey (57) ABSTRACT

A method, computer program product, and a data processing system for controlling a first climate control device is provided. An operational mode is obtained for each of a plurality of climate control devices. The operational mode of each of the plurality of climate control devices is compared with a desired operational mode of the first climate control device. A determination of whether any of the operational modes of the plurality of climate control devices differs from the desired operational mode. The first climate control device is placed in the desired operational mode dependent on the comparison of the operational modes of the plurality of climate control devices with the desired operational mode.

3 Claims, 6 Drawing Sheets

METHOD AND SYSTEM FOR SYNCHRONIZING CLIMATE CONTROL DEVICES

BACKGROUND OF THE INVENTION

1. Technical Field

The present invention relates generally to an improved data processing system and in particular to a method and computer program product for synchronizing climate control devices in a network system.

2. Description of Related Art

Locales or facilities having wide fluctuations in daily temperatures often require air conditioning and heating at different times of the day. A climate control conflict may arise in a facility requiring both daily air conditioning and heating when two or more climate control zones are commonly located in the facility. For example, automated climate control systems having multiple zone environments include thermostats deployed at separate locations in a facility. The thermostats will select either an air conditioning mode or a heating mode based on the sensed temperature and the parameters programmed in the climate control system.

In multiple zoned environments, a situation may arise in which an automated and/or a manual climate control system has one or more climate control devices activated in an air conditioning mode and one or more climate control devices activated in a heating mode. Such a situation results in inefficient energy usage. The automatic thermostats may be manually synchronized so that all climate control devices are activated in a common mode. However, such a solution defeats the purpose of deploying an automated climate control system. The manual thermostats have no way of notifying the user of an inconsistent setting with other thermostats. No automated solutions are known for enabling synchronization of multiple climate control devices in an automated climate control system featuring multiple peer thermostats.

Thus, it would be advantageous to provide a method and system for synchronization of climate control devices in a climate control system having no master controller or master thermostat. It would be further advantageous to provide a climate control system featuring peer thermostat control units that control respective climate control devices in which the operation of the climate control devices are synchronized.

SUMMARY OF THE INVENTION

The present invention provides a method, computer program product, and a data processing system for collaborative synchronization of climate control devices. An operational mode is obtained for each of a plurality of climate control devices. The operational mode of each of the plurality of climate control devices is compared with a desired operational mode of the first climate control device. A determination of whether any of the operational modes of the plurality of climate control devices differs from the desired operational mode. The first climate control device is placed in the desired operational mode dependent on the comparison of the operational modes of the plurality of climate control devices with the desired operational mode.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 6A1, 6A2 and 6B are flowcharts of processing performed by a control unit attempting to determine the preferred operational mode, or processing of a conflict threshold, in accordance with a preferred embodiment of the present invention.

DETAILED DESCRIPTION OF THE PREFERRED EMBODIMENT

Figure 1:
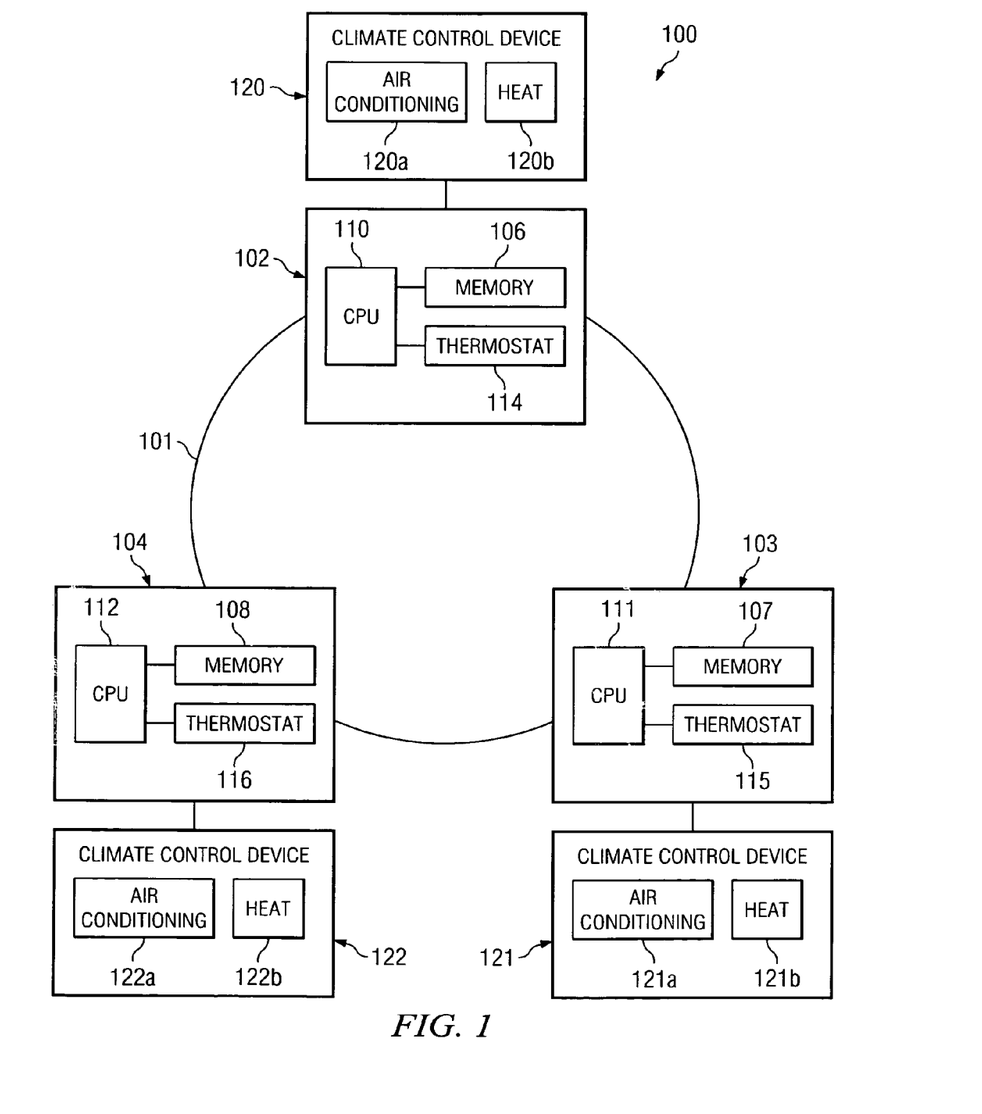
FIG. 1 depicts a pictorial representation of a network of climate control devices in which the present invention may be implemented.

With reference now to the figures, FIG. 1 depicts a pictorial representation of a network of climate control devices in which the present invention may be implemented. Network system 100 contains a network 101, which is the medium used to provide communications links between various devices connected together within network system 100. Network 101 may include connections such as wire, wireless communication links, or fiber optic cables.

In the depicted example, climate control devices 120–122 are connected to network 101 along with respective control units 102–104. Control units 102–104 may comprise, for example, processing units 110–112 and associated memory devices 106–108. In the depicted example, memory devices 106–108 provide data, such as a climate control application, to processing units 110–112. Network system 100 may include additional computational devices not shown. Network system 100 also may be implemented as a number of different types of networks, such as for example, an intranet, a local area network (LAN), or a wireless communication network. FIG. 1 is intended as an example, and not as an architectural limitation for the present invention.

Climate control devices 120–122 are respectively representative of both an air conditioning device 120*a*–122*a* and a heating device 120*b*–122*b* and thus may be implemented as multiple co-located devices or physically remote devices within an infrastructure having a climate to be regulated by network system 100.

Figure 2:
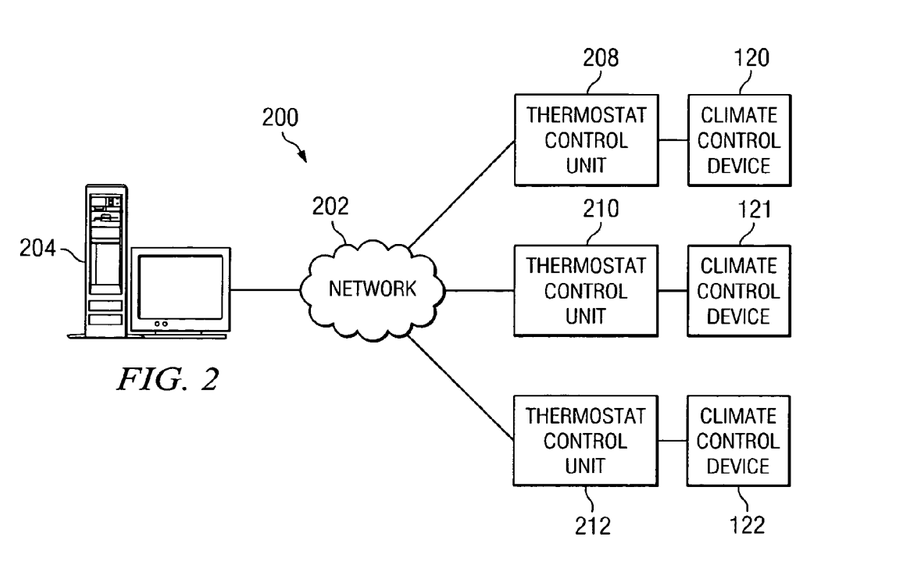
FIG. 2 depicts a pictorial representation of an alternative network configuration in which the present invention may be implemented.

FIG. 2 depicts a pictorial representation of an alternative network configuration in which the present invention may be implemented. Network data processing system 200 is a network of thermostat control units in which the present invention may be implemented. Network data processing system 200 contains a network 202, which is the medium used to provide communications links between various thermostat control devices and a central control data processing system connected together within network data processing system 200. Network 202 may include connections, such as wire, wireless communication links, or fiber optic cables.

In the depicted example, central control data processing system 204 is connected to network 202. In addition, thermostat control units 208, 210, and 212 are connected to network 202. These thermostat control units 208, 210 and 212 may be processing or computational devices suitable for activating and deactivating air conditioning and heating devices of climate control devices 120–122, and for communication with central control data processing system 204 via network 202. In the depicted example, central control data processing system 204 provides queries, such as queries for the operational mode of climate control devices 120–122. Network 202 may be implemented as a number of different types of networks, such as for example, the Internet, an intranet, a local area network (LAN), or another suitable communications infrastructure. FIG. 1 is intended as an example, and not as an architectural limitation for the present invention.

Figure 3:
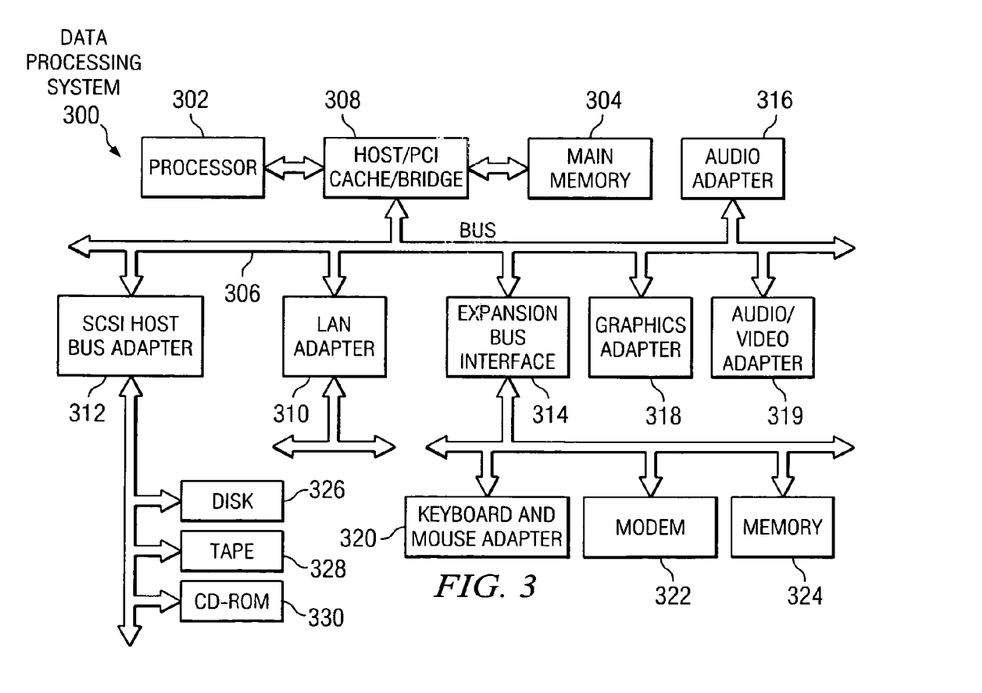
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of central control data processing system 204 shown in FIG. 2. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

In accordance with a preferred embodiment of the present invention, a climate control system is implemented that facilitates synchronization of the operational modes of climate control devices 120–122. Control units 102–104 respectively regulate the operational mode of climate control devices 120–122. As referred to herein, a control unit is said to be operating in a cooling mode when the control unit has activated an air conditioning device of an associated climate control device, and a control unit is said to be operating in a heating made when the control unit has activated a heating device of an associated climate control device. As referred to herein, a climate control device is said to be activated when either the air conditioning device or heating device of the climate control device is activated. As referred to herein, a control unit that is operational, that is not disabled or otherwise unresponsive, that is not operating in a heating mode or cooling mode is said to be in an idle mode. As referred to herein, a control unit that is in an operational mode and has an associated climate control device(s) temporarily disabled, for example a control unit that has a heating and air-conditioning device manually switched off but is otherwise responsive to network queries or commands, is said to be off.

A control unit may selectively direct a climate control device (either a heating device or an air conditioning device) to activate or deactivated by any one or more of various directives. For example, a control unit may direct a climate control device to activate or deactivate in response to a manual user input. Additionally, a control unit may direct a climate control device to activate or deactivate responsive to program directives resulting from a climate control program or application that provides an "auto" mode climate control. As referred to herein, a control unit configured to operate in an auto mode activates or deactivates a climate control device in response to a temperate measured by an associated thermostat device. For example, a control unit configured in the auto mode may activate an air conditioning device responsive to a temperature measured by an associated thermostat that exceeds a predefined temperature. Likewise, a control unit configured in the auto mode may active a heating device responsive to a temperature measured by an associated thermostat that is less than a predefined temperature.

In accordance with a preferred embodiment of the present invention, one or more of control units 102–104 is configured to operate in a thermostat synchronization mode. Activation of a climate control device by an associated control unit configured in the thermostat synchronization mode is contingent on an evaluation of the operational status of one or more other climate control device or devices in network system 100 as described more fully below.

Figure 4:
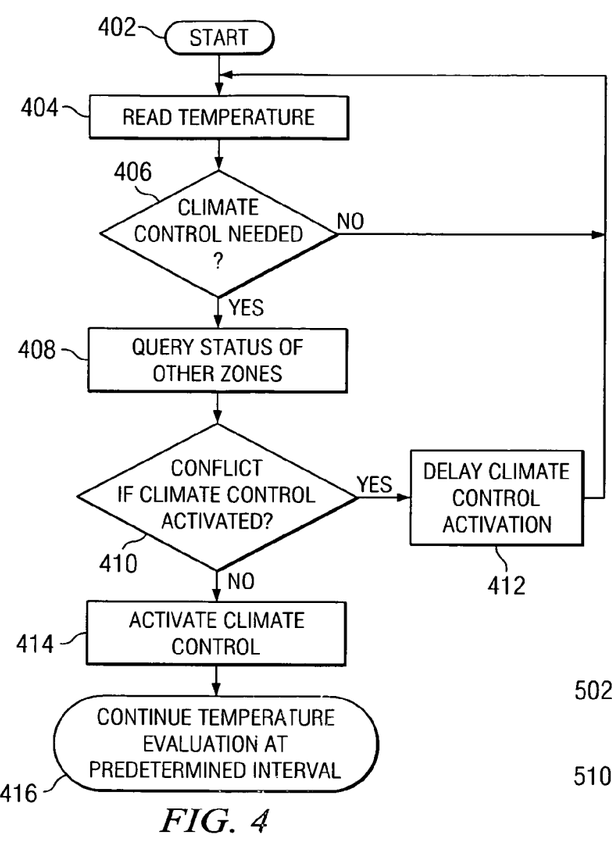
FIG. 4 is a flowchart of a thermostat synchronization routine performed in accordance with a preferred embodiment of the present invention

FIG. 4 is a flowchart of a thermostat synchronization routine performed in accordance with a preferred embodiment of the present invention. A control unit begins processing (step 402) and may periodically evaluate or read a zone temperate or other climate control directive associated with the control unit (step 404). For example, the control unit may evaluate the temperature, a time of day, or other parameter(s) for determination of a desired cycle or operational mode of an associated climate control device. An evaluation of whether climate control is needed is made responsive to reading the temperature or other climate control parameter (step 406). If a determination is made that no climate control is currently needed, processing returns to step 404 for evaluation of the current zone temperature or other climate control parameter. A predefined delay or interval may elapse between the return to step 404 when a determination is made that no climate control is currently needed at step 406. In the event that the evaluation step 406 results in a determination that climate control is needed, one or more queries for the operational status of other climate control zones is performed (step 408). On receipt of the climate control status of other climate control zones, an evaluation is made to determine if a conflict would arise between climate control devices of network system 100 if climate control is activated by the control unit (step 410). If a conflict in the operation of climate control devices would result by activation of a climate control device associated with the control unit, a delay in climate control activation is invoked (step 412), and processing subsequently returns to step 404 for obtaining the current temperature or other directive. In an alternative embodiment, a safety override feature may be implemented to active a climate control device even when a climate control conflict is identified as described more fully below. Alternatively, evaluation step 410 may utilize a conflict threshold for determination of whether to activate climate control by the control unit. If no conflict will result (or alternatively if the conflict threshold will not be exceeded) if climate control is activated, climate control is then activated (step 414). Control unit processing may then resume periodic temperature or climate control cycle evaluation (step 416).

Figure 5:
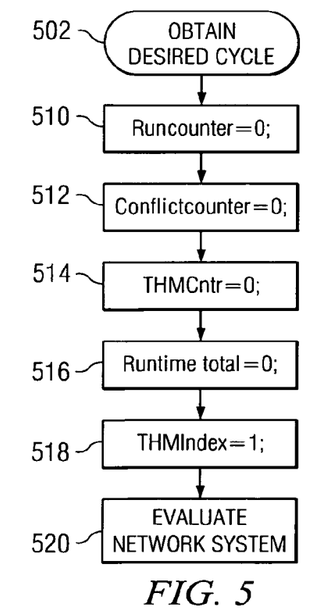
FIG. 5 is flowchart of a control unit attempting to invoke an operational mode of an associated climate control device in accordance with a preferred embodiment of the present invention.

FIG. 5 is flowchart of control unit processing for a control unit of network system 100 that is attempting to invoke an operational mode of an associated climate control device in accordance with a preferred embodiment of the present invention. As referred to herein, a control unit attempting to invoke an operational mode of an associated climate control device is referred to as a requesting control unit. The operational mode, e.g., cooling or heating, that the requesting control unit is attempting to invoke is referred to herein as the desired cycle of the desired operational mode.

The synchronization routine is invoked and a desired cycle is determined based on the time of day, a measured temperature, or other climate control directive (step 502). For example, different desired cycles may be stored in a memory device of the control unit for defining desired cycles for different times of the day, season, or other period. A number of variables are then initialized to facilitate the evaluation of network system 100 by the requesting control unit. For example, a counter variable Runcounter that is used to store a count of the number of control units active in the desired cycle is initialized to zero (step 510). A counter variable Conflictcounter that stores a count of the number of control units operating in a mode that conflicts with, that is that does not equal, the desired cycle is initialized to zero (step 512). A variable THMCntr is initialized to zero (step 514) and is used for maintaining a count of control units in network system 100 that are operational. Additionally, a variable Runtime_total that is used to store a count of the cumulative elapsed time over which climate control devices have been activated is initialized to zero (step 516). A THMIndex variable is then initialized to 1 (step 518). Each control unit 102–104 of network system 100 is associated with a unique THMIndex value and provides a mechanism for addressing and evaluating an operational state of a particular control unit. The control unit then proceeds to evaluate the network system for suitability of performing a climate control cycle (step 520) as described more fully below with reference to FIGS. 6A and 6B.

Figure 6A:
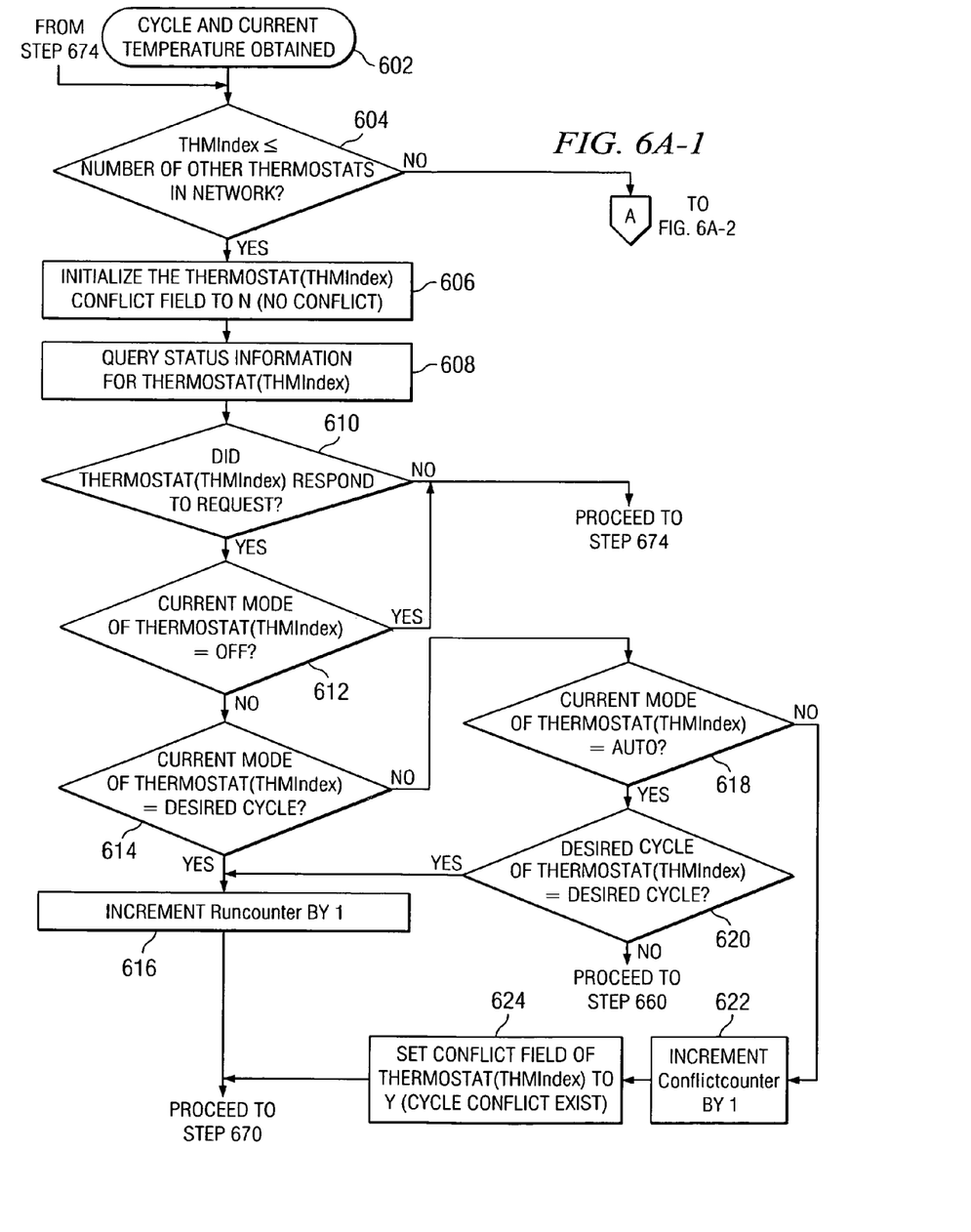
Figure 6A:
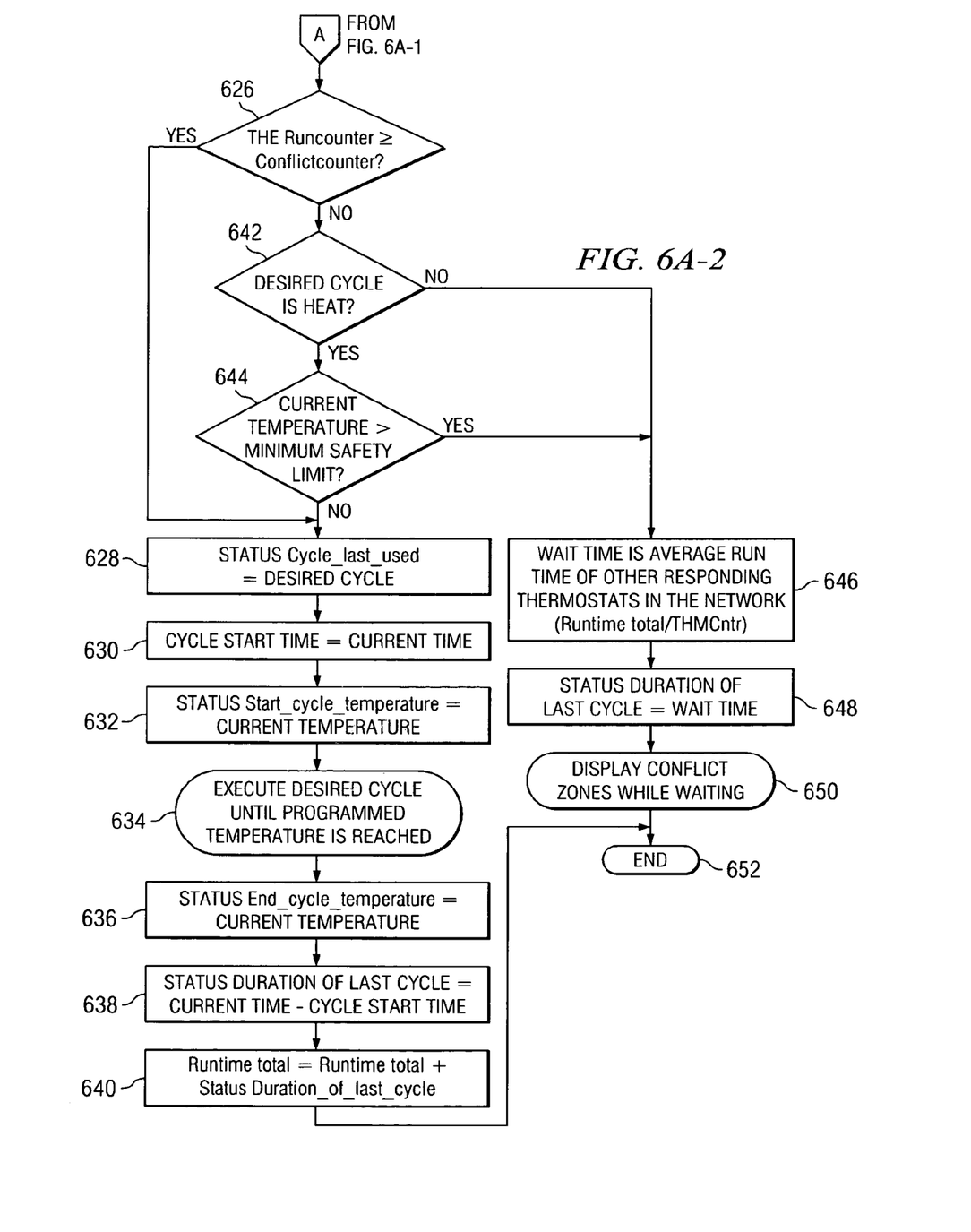

FIG. 6A is a flowchart of processing performed by a control unit when evaluating the suitability of network system 100 for activating a climate control device upon receipt of a cycle and current temperature in accordance with a preferred embodiment of the present invention. Preferably, a control unit maintains a table or other data structure for recording the operational status or other parameters of control units within network system 100. While the control unit is attempting to activate an associated climate control device, it queries and evaluates the operational mode of the other climate control units within network 100. Upon receipt of a cycle and current temperature, the synchronization routine is invoked and various variables and other parameters are initialized (step 602) as described above with reference to FIG. 5. A comparison of THMIndex with the number of other thermostats in the network is made (step 604). In the event the THMIndex is less or equal to the number of other thermostats in the network indicating that other control units remain to be queried for their operational mode, a thermostat conflict field associated with the control unit being queried is initialized to false (N) to indicate a default non-conflict status of the queried control unit (step 606). The conflict field is preferably maintained in the memory unit of the requesting control unit in association with the THMIndex value of the queried control unit. The requesting control unit then queries status information for the currently indexed thermostat (step 608). For example, a query message is transmitted from the requesting control unit to the control unit indexed by the THMIndex value by way of network 101. The requesting control unit then evaluates whether a response to the query was received (step 610). If a query response is not obtained after, for example, a predefined interval, the controller proceeds to increment the THMIndex as described below with reference to step 674 in FIG. 6B in preparation for issuing additional control unit queries. If a valid response is received from the currently indexed control unit queried as described in step 610, the requesting control unit proceeds to evaluate whether the current mode of the queried thermostat is OFF (step 612). If the query response of the currently indexed control unit indicates the climate control device associated with the queried control unit is in the OFF mode, the requesting control unit proceeds to increment the thermostat index variable according to step 674 of FIG. 6B.

If the response obtained from the queried control unit does not indicate the climate control device associated with the queried control unit is in the OFF mode at step 612, the requesting control unit evaluates whether the current mode of the queried thermostat corresponds to the desired cycle (step 614). In the event the queried control unit is evaluated as operating in the desired cycle, the requesting control unit increments the Runcounter (step 616) thereby updating a count of the number of climate control devices running in the same mode as the desired cycle and proceeds to step 670 described below with reference to FIG. 6B.

Returning again to step 614, if the current mode of the queried control unit does not equal the desired cycle as indicated in the status query response provided by the queried control unit, the requesting control unit proceeds to evaluate whether the current mode of the currently indexed control unit is operating in the auto mode (step 618). If the query response indicates the current mode of the currently indexed control unit is in the auto mode, an evaluation is made to determine if the desired cycle of the queried control unit running in the auto mode is equal to the desired cycle of the requesting control unit (step 620). If the desired cycle of the control unit running in auto mode is equal to the desired cycle of the requesting control unit, the Runcounter variable is incremented (step 616) and the routine proceeds to step 670 of FIG. 6B as described below. If the desired cycle of the control unit running in auto mode is not equal to the desired cycle of the requesting control unit then the routine proceeds to step 660 of FIG. 6B to further evaluate the mode change. The mode change will be explained more fully below.

Returning again to evaluation of the current mode of the thermostat described with reference to step 618, an evaluation that the current mode of the queried control unit is not in auto mode indicates that the control unit was previously placed in a mode that differs from the desired cycle. Accordingly, the Conflictcounter variable is incremented (step 622) and the conflict field associated with the queried control unit is set to true (Y) to indicate a conflict would exist between the requesting control unit and the queried control unit (step 624) if the requesting control unit were to place the associated climate control device in the desired cycle. The control unit then proceeds to step 670 of FIG. 6B to accumulate the run time of the queried control unit as described more fully below.

Returning again to step 604, an evaluation that the THMIndex is greater than the number of other thermostats in the network indicates that the operational mode of all control units have been evaluated. An evaluation is then made to determine if switching the climate control device of the requesting control unit into the desired cycle will result in a climate control device conflict. For example, a conflict state of network system 100 may be defined as a state in which the number of climate control devices operating in the desired cycle does not exceed the number of climate control devices operating in an active mode that differs from the desired cycle. Accordingly, a comparison of the Runcounter and Conflictcounter variables may be made to determine if switching the climate control device associated with the requesting control unit into the desired cycle will result in the network system operating in a climate control conflict state (step 626). That is, a comparison between the Runcounter and Conflictcounter variables is made to determine if the Runcounter variable equals or exceeds the Conflictcounter variable. In the event that the Runcounter variable equals or exceeds the Conflictcounter variable thus indicating that the requesting control unit may switch the associated climate control device into the desired cycle, a status variable Cycle_Last_Used that records the most recently active cycle of the requesting control unit is set to the desired cycle (step 628). The cycle start time is then set to the current time (step 630), and the status variable start_cycle_temperature is set to the current temperature (step 632). The desired cycle is then executed until the programmed temperature is reached (step 634). A status variable end_cycle_temperature is then set to the current temperature (step 636). A status variable Duration_of_last_cycle is then set to the difference between the current time and the cycle start time (step 638). The status variable Runtime_total that records the total climate control device active time of all climate control devices in network system 100 is updated as a sum of the last cycle duration recorded by the status variable Duration_of_last_cycle and the previously recorded Runtime_total value (step 640). The climate control routine of the requesting control unit then exits (step 652).

Returning again to evaluation of the Runcounter and Conflictcounter at step 626, an evaluation that the Runcounter is not greater or equal to the Conflictcounter variable thus indicating that switching the climate control device associated with the requesting control unit would result in a climate control device conflict, an evaluation of the desired cycle is made (step 642). Particularly, the desired cycle is evaluated to determine if the desired cycle is heat (step 642). An evaluation of the desired cycle after determining that switching the climate control device associated with the requesting control unit would result in a conflict state of network system 100 may be made for safety precautions. For example, a minimum allowable temperature may be defined and associated with control units or zones to, for example, prevent freezing temperatures or other extreme temperatures within a zone. If the desired cycle is not evaluated as heat, the routine proceeds to enter a wait mode (step 646). For example, the wait time may be selected as an average cycle run time of other responding control units in network system 100. The status variable Duration_of_last_cycle of the requesting control unit is then updated as the wait time (step 648). Additionally, a display of conflict zones may be provided on a display device during the wait period (step 650), and the control unit synchronization cycle exits (step 652).

If the desired cycle is evaluated as heat at step 642, the current temperature is compared with a safety limit temperature, such as a minimum allowed temperature (step 644) and the routine proceeds to execute a wait period according to step 646 if the current temperature exceeds the minimum safety temperature. In the event the current temperature does not exceed the minimum safety temperature, the control unit then prepares for activating an associated climate control device into the desired cycle by proceeding to update the status variable Cycle_Last_Used to the desired cycle according to step 628.

Figure 6B:
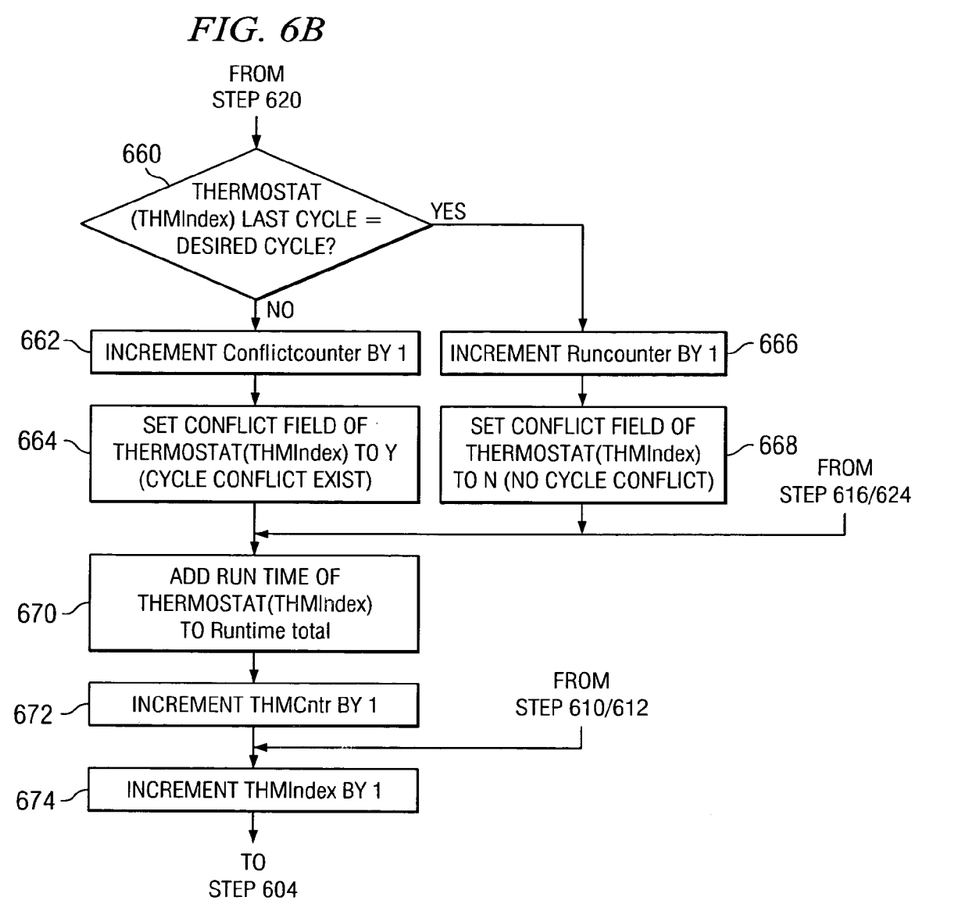

With reference now to FIG. 6B, control unit processing of a requesting control unit is shown in accordance with a preferred embodiment of the present invention. The control processing of the requesting control unit shown in FIG. 6B is a continuation of the processing shown and described in FIG. 6A. The last active cycle of the queried control unit is evaluated (step 660) in the event that the queried control unit is evaluated as operating in the auto mode but does not have an associated climate control device operating in the desired cycle as evaluated at step 620 in FIG. 6A. If the last cycle of the queried control unit does not equal the desired cycle, the conflict counter is incremented (step 662) and the conflict field associated with the queried control unit is set to true (Y) (step 664). This path is taken when a requesting automatic climate control unit is directed to change climate control modes based on its programmed parameters. The control unit routine then proceeds to update the status variable Runtime_total (step 670).

If at step 660 the evaluated last cycle does equal desired cycle, the requesting control unit increments the status variable Runcounter (step 666) and sets the conflict field associated with the queried control unit to false (N) (step 668). This path is taken when the queried climate control unit has changed climate control mode but has not been able to start the new mode due to a conflict with the preferred network mode. The other climate control units will be allowed to run as long as their desired mode is the preferred network mode. The climate control unit then proceeds to update the status variable Runtime total in accordance with step 670.

Upon update of the status variable Runtime_total at step 670, the THMCntr counter is incremented to indicate the number of control units in network system 100 that have responded to the status query issued by the requesting control unit (step 672). The THMIndex variable is then incremented (step 674). Processing then returns to comparison of the THMIndex with the number of thermostats in the network according to step 604 of FIG. 6A. The control unit procedures described above are repeated until all control units have been queried as indicated by a No evaluation at step 604 at which point the conflict status of network system 100 is evaluated as described above with reference to step 626.

Thus, a method and system for synchronization of climate control devices in a climate control network system is provided. The climate control network system may feature thermostat control units that control respective climate control devices in which the operation of the climate control devices are synchronized. The operational efficiency and energy usage of the network system is thus enhanced.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product in a computer readable medium for controlling a climate control system, the computer program product comprising:
    first instructions that issue a query for an operational mode of a plurality of climate control devices;
    second instructions, responsive to receipt of a response message, that compare the operational mode of at least one of the plurality of climate control devices with a desired operational mode of a first climate control device; and
    third instructions that perform an evaluation of whether activating the first climate control device in the desired operational mode will result in a climate control device conflict, wherein the second instructions, responsive to receiving a response message that indicates a first climate control device of she plurality of climate control devices is not in an active mode, compare a most recent active operational mode of the first of the plurality of climate control devices with the desired operational mode.

2. The computer program product of claim 1, wherein the third instructions increment a count of the plurality of climate control devices in the desired operational mode responsive to identifying the most recent active operational mode as the desired operational mode.

3. The computer program product of claim 1, wherein the third instructions increment a count of the plurality of climate control devices that are not active in the desired operational mode responsive to identifying the most recent active operational mode as different than the desired operational mode.

* * * * *